(12) United States Patent
Bergstrom et al.

(10) Patent No.: US 8,407,616 B2
(45) Date of Patent: Mar. 26, 2013

(54) GRAPHICAL USER INTERFACES AND METHODS FOR THERMOGRAPHY

(75) Inventors: Peter A. Bergstrom, St. Paul, MN (US); Jordan B. Schlichting, New Hope, MN (US)

(73) Assignee: Fluke Corporation, Everett, WA (US)

(*) Notice: Subject to any disclaimer, the term of this patent is extended or adjusted under 35 U.S.C. 154(b) by 1211 days.

(21) Appl. No.: 12/201,683

(22) Filed: Aug. 29, 2008

(65) Prior Publication Data

US 2010/0058222 A1 Mar. 4, 2010

(51) Int. Cl.
*G06F 3/048* (2006.01)
*G01K 13/00* (2006.01)
*G01K 1/08* (2006.01)
*G01J 5/00* (2006.01)
*G02F 1/01* (2006.01)

(52) U.S. Cl. ........ 715/782; 702/130; 702/132; 374/121; 250/330

(58) Field of Classification Search ................ 715/764, 715/781, 782; 250/330, 332; 348/164; 382/190; 600/473, 474; 702/130, 132
See application file for complete search history.

(56) References Cited

U.S. PATENT DOCUMENTS

| | | | |
|---|---|---|---|
| 5,818,951 A | 10/1998 | Schivley | |
| 6,104,298 A | 8/2000 | Flanders | |
| 7,171,328 B1* | 1/2007 | Walker et al. | 702/136 |
| 7,519,210 B2* | 4/2009 | Hirsch et al. | 382/128 |
| 7,732,768 B1* | 6/2010 | Haigh et al. | 250/332 |
| 7,996,066 B2* | 8/2011 | Schlagheck et al. | 600/474 |
| 2006/0131464 A1* | 6/2006 | Hesser et al. | 246/169 D |
| 2008/0312942 A1* | 12/2008 | Katta et al. | 705/1 |
| 2009/0326381 A1* | 12/2009 | Yuan et al. | 600/473 |

* cited by examiner

*Primary Examiner* — Haoshian Shih
(74) *Attorney, Agent, or Firm* — Fredrikson & Byron, P.A.

(57) ABSTRACT

A graphical user interface facilitates methods for analyzing a temperature distribution across a scene that is captured by a thermal imaging device. Preferably, the interface includes a both a two-dimensional image of the captured scene and a three-dimensional representation of the captured scene. The three-dimensional representation is formed by a plurality of pixels, each of which are coded by a qualitative value from within a range of qualitative values, and each value, within the range, corresponds to a temperature. Each of the plurality of pixels is arranged, in a first and a second dimension of the three dimensions, according to a position of a corresponding pixel of the two-dimensional image, and, in a third dimension, according to a magnitude of the temperature associated therewith.

45 Claims, 8 Drawing Sheets

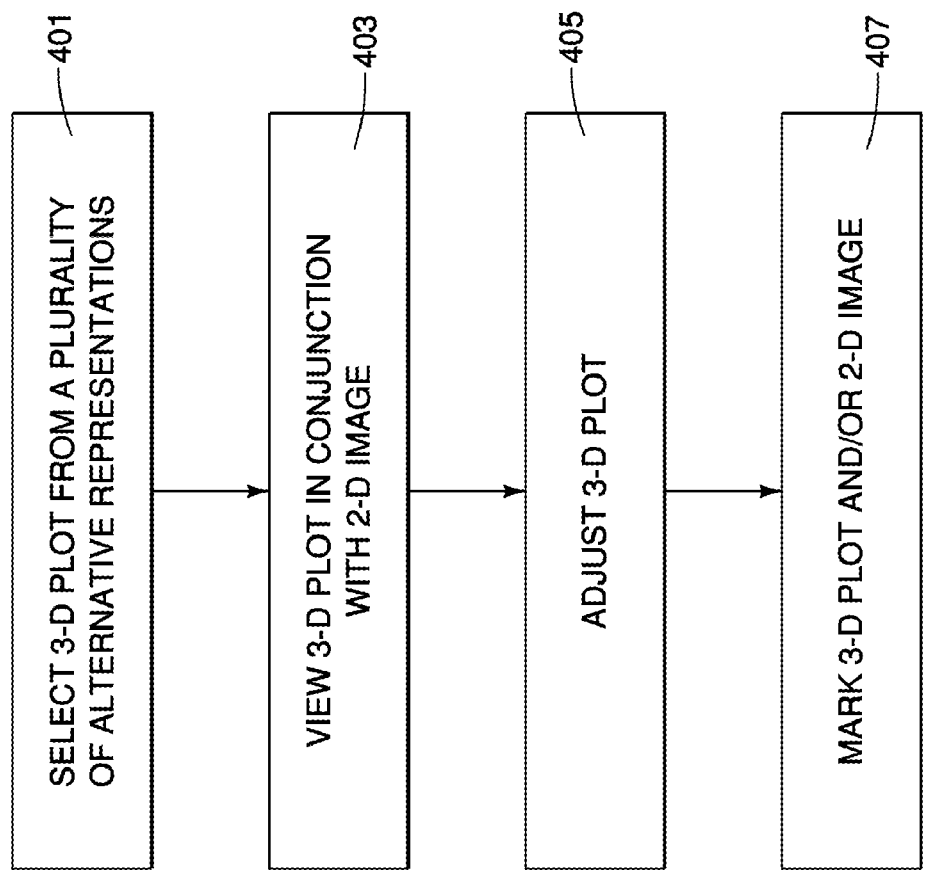

GRAPHICAL USER INTERFACES AND METHODS FOR THERMOGRAPHY

TECHNICAL FIELD

The present invention pertains to thermography and more particularly to graphical user interfaces and associated methods for analyzing temperature distributions across a scene that is captured by a thermal imaging device.

BACKGROUND

Thermal images of electrical devices, mechanical devices and structures can be useful for analyzing the performance thereof, both during design and development, for example, for design optimization purposes, and during operational service, for example, for inspection and maintenance purposes. These thermal images may be captured, displayed, stored and transferred to a computer workstation by an infrared (IR) camera, according to methods known to those skilled in the art. Some examples of such a camera, are the Ti25 available from Fluke Corporation, and the Fluke Ti 55 Thermal Imager.

A displayed thermal image of an object, or scene, which is typically presented on a display of the computer workstation in two dimensions, is composed of corrected digital image data that has been mapped and scaled to an array of pixels, wherein a color, or a gray-scale value, of each pixel corresponds to a detected temperature, or temperature range, of the corresponding portion of the object. Although such an image can indicate to a viewer, the general location of high or low temperature zones, and can give an idea of temperature gradients over the object, the amount of information presented by such an image may be difficult for the viewer to process for accurate and efficient analysis. Thus there is a need for graphical user interfaces that facilitate more rapid and accurate analysis methods.

BRIEF DESCRIPTION OF THE DRAWINGS

The following drawings are illustrative of particular embodiments of the invention, and are not intended to limit the scope of the invention. The drawings are not to scale (unless so stated) and are intended for use in conjunction with the explanations in the following detailed description. Embodiments of the disclosure will hereinafter be described in conjunction with the appended drawings, wherein like numerals denote like elements.

FIG. 4 is a flow chart outlining some methods of the present invention.

Due to the limitations imposed on patent application Figures, with respect to color, the images and representations of FIGS. 2A-3C and 5, although originally coded with color values from the spectrum of visible light, are shown in a grayscale format, which is a function of grayscale reproduction. It should be noted that the scope of the present invention is not limited to any particular type of scale of qualitative values for coding quantitative values, nor to a particular resolution thereof.

DETAILED DESCRIPTION

The following detailed description is exemplary in nature and is not intended to limit the scope, applicability, or configuration of the invention in any way. Rather, the following description provides practical illustrations for implementing exemplary embodiments. Utilizing the teaching provided herein, those skilled in the art will recognize that many of the examples have suitable alternatives that can be utilized.

Figure 1:
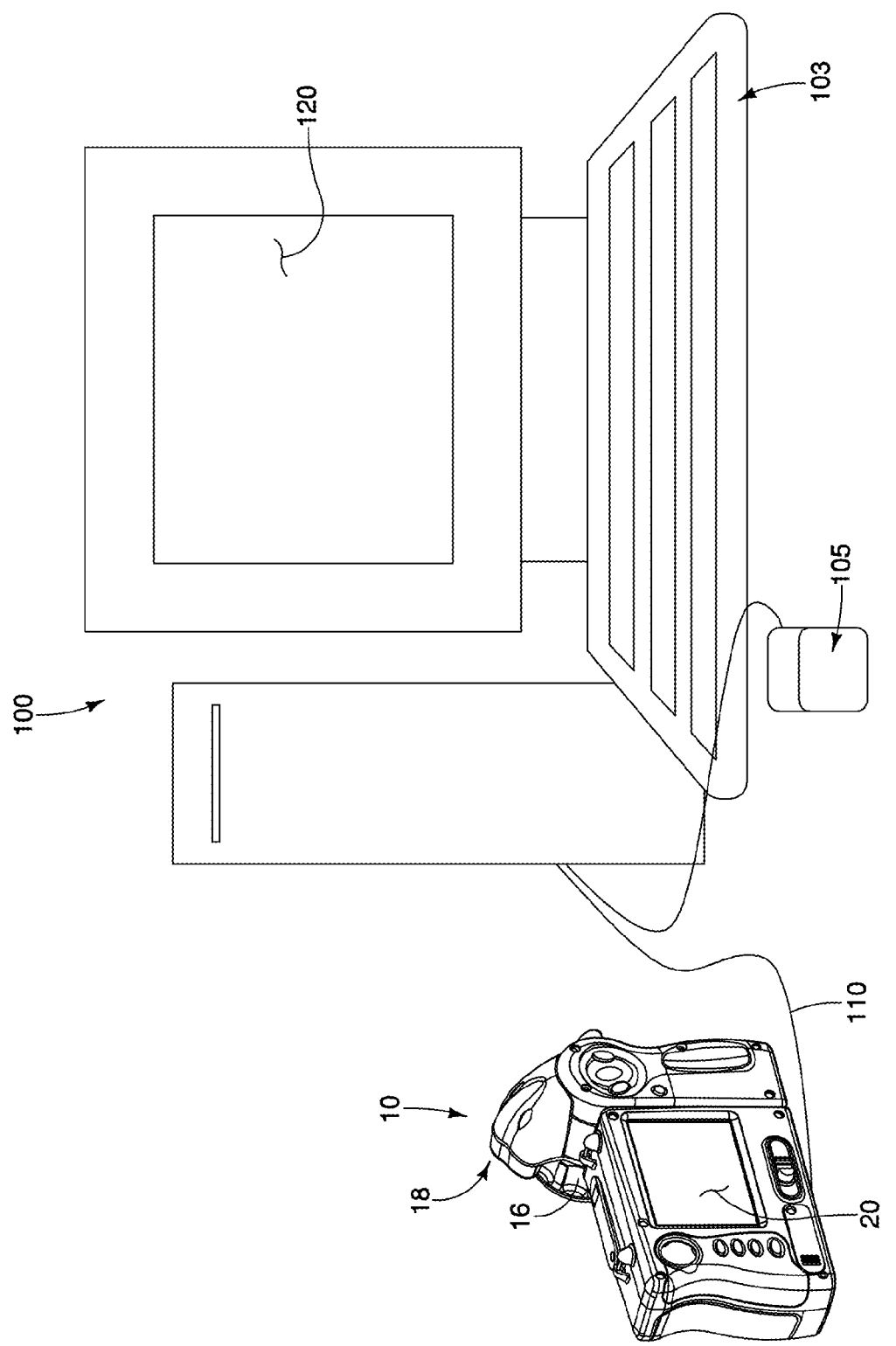
FIG. 1 is a schematic of an exemplary IR camera connected to a workstation, either of which may employ embodiments of the present invention.

FIG. 1 is a schematic of an exemplary thermal imaging and analysis system, which includes an IR camera 10 connected to a workstation 100, for example, a personal computer, on which a thermography software program, adapted for displaying and manipulating data, which is transferred from camera 10, is loaded. FIG. 1 illustrates camera 10 including a focus ring 16 for focusing an IR lens (not shown) of camera 10; those skilled in the art will appreciate that camera 10 further includes an IR sensor assembly, for example, a microbolometer focal plane array, aligned with the IR lens, which is focused with ring 16, to receive IR radiation data from an object, or scene, of interest. FIG. 1 further illustrates camera 10 including a visible light (VL) camera module 18. Electronics included in camera 10 have the capability to convert the raw IR radiation to digital image data, and then to correct, map and scale the digital image data for display, either on a display 20 of camera 10, or on a display 120 of workstation 100, as a combined image with VL image data, captured by VL camera module 18, according to methods known in the art. Although FIG. 1 illustrates a data transfer cord 110 coupling camera 10 to workstation 100, for data transfer therebetween, it should be understood that alternative means, such as wireless communication and/or a plug-in memory card may be employed to transfer the data. With further reference to FIG. 1, workstation 100 is shown including a keyboard 103 and a mouse 105, either of which may be used to manipulate interactive element of user interfaces of the present invention.

Figure 2A:
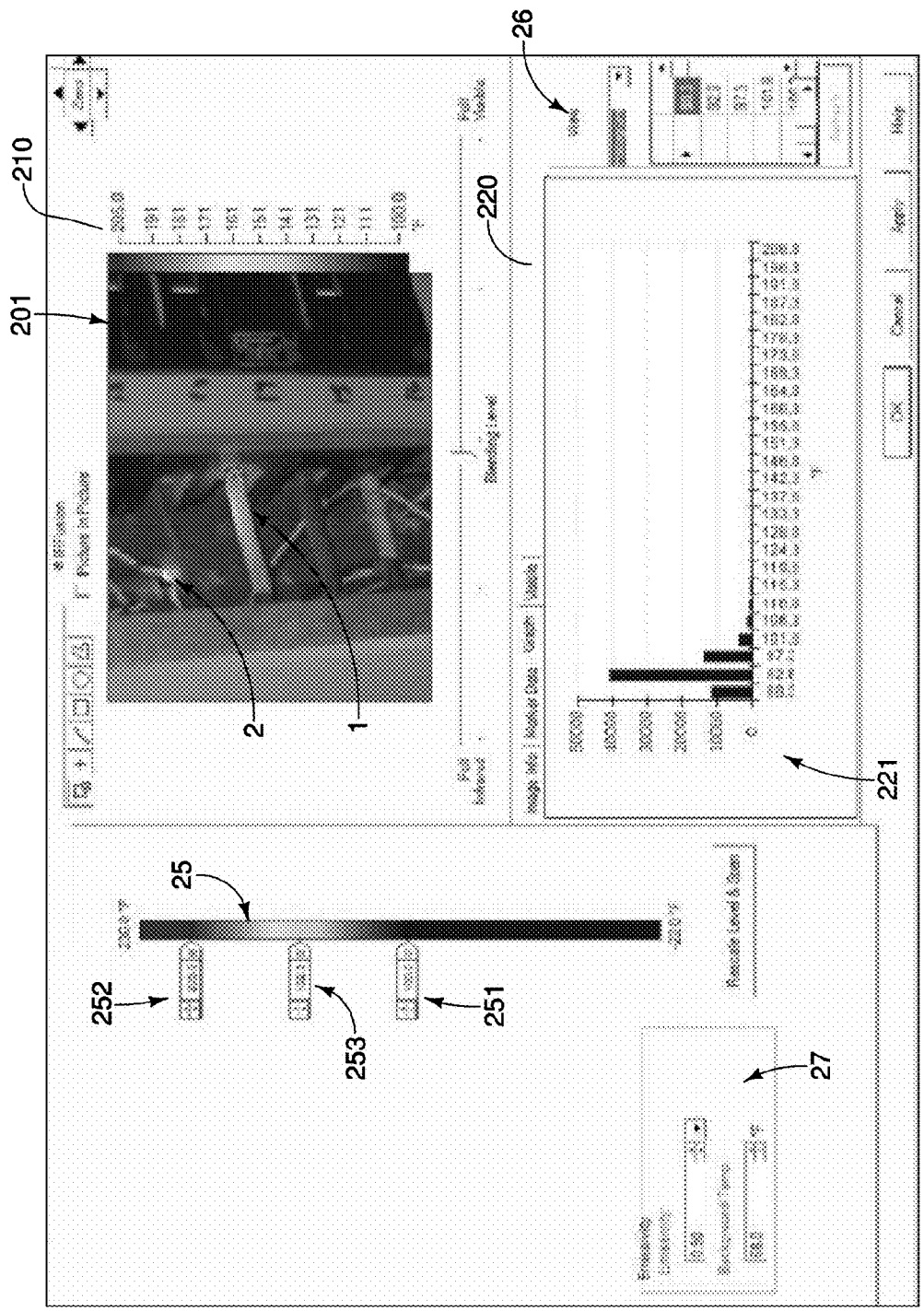
FIG. 2A is a snapshot of an exemplary graphical user interface, which includes two display areas.

FIG. 2A is a snapshot of an exemplary graphical user interface, which includes a first display area 210 and a second display area 220. FIG. 2A illustrates first display area 210 including an image 201 of a scene (a 3-phase breaker circuit) captured by a thermal imaging device, for example, camera 10 of FIG. 1; image 201 is made up of a plurality of pixels, displayed in two dimensions, each of which are coded with a qualitative value from within a range of qualitative values, wherein each qualitative value corresponds to a quantitative value of temperature detected, for example, by an IR sensor assembly, such as a microbolometer focal plane array. The range of qualitative values is shown by a palette bar 25, which is also displayed by the interface illustrated in FIG. 2A (and in FIGS. 3A and 3C). Because the Figures in the present application are grayscale reproductions of color images, it should be noted, again, that the original range, or scale, of qualitative values, which were used for coding, were defined along the spectrum of visible light, wherein cooler hues correspond to lower temperatures and warmer hues to higher temperatures, such as is known to those skilled in the art of thermography. Other scales of qualitative values, which may be employed, include, without limitation, grayscale inverted and amber inverted.

FIG. 2A further illustrates two higher temperature zones 1 and 2 within the captured scene of image 201, which, by the coding of the plurality of pixels that make up image 201, may have been brought to a viewer's attention, yet zone 2 may have been overlooked by a viewer, since zone 2 is positioned rearward of zone 1 and may not have been of immediate interest for the initial thermal analysis of the breaker circuit. In other situations, default settings of thermography software may mask hot or cold spots in the captured scene, for example, if one or more temperatures detected in the captured scene are outside the default temperature range. FIG. 2A shows display area 220 including a histogram 221 of the captured scene of image 201, which may be helpful in analyzing the temperature information presented by image 201, but does not serve to highlight the location of one or more high or low temperature zones within the captured scene. Another standard representation, which may be shown in display area 220, is a line temperature profile, but such a profile is limited to a particular line, which is established along image 201 by a user, or by default settings of the software, so, if the user overlooks one or more regions of interest in image 201, or the default settings of the software mask one or more regions of interest, such a representation will not be useful to bring the overlooked region(s) to the user's attention.

Figure 2B:
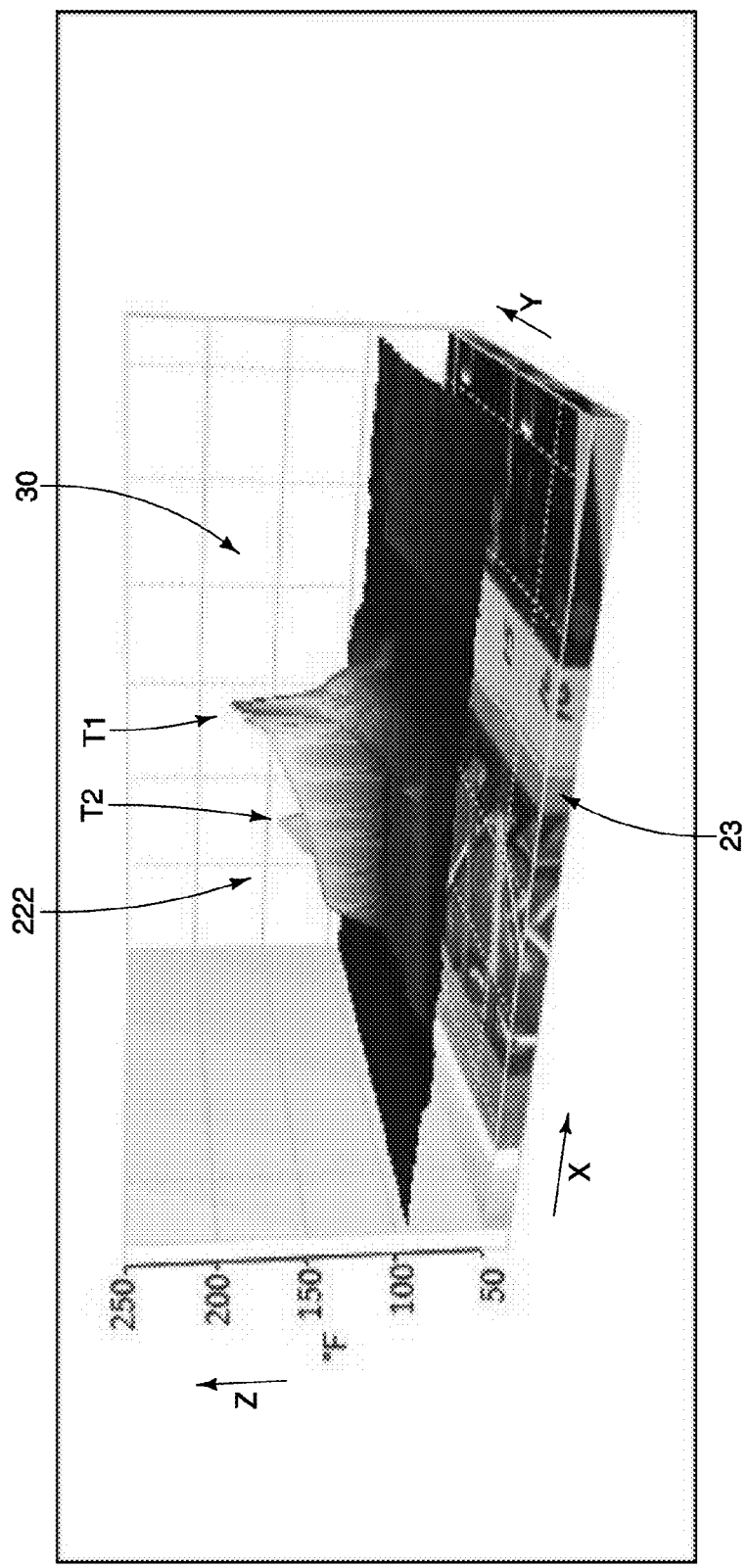
FIG. 2B is an example of a three-dimensional plot, or thermal representation, which may be included in a display area of a graphical user interface, according to some embodiments of the present invention.

FIG. 2B is an example of a three-dimensional thermal plot, or representation 222, which may be included in display area 220 of a graphical user interface, for example, as an alternative to histogram 221 or the line temperature profile, according to some embodiments of the present invention. According to some alternate embodiments the user interface may include display area 220 without display area 210, in which case, representation 222 is viewed as an alternative to image 201. FIG. 2B illustrates representation 222 displayed within a three-dimensional (3-D) coordinate system 30 and being made up of a plurality of pixels which correspond to those making up image 201 of FIG. 2A. FIG. 2B further illustrates an optional two-dimensional (2-D) VL image 23 of the captured scene, which is also displayed within 3-D coordinate system 30, alongside representation 222. The plurality of pixels that make up representation 222 are arranged in a first dimension X and in a second dimension Y, according to an arrangement of both the plurality of pixels that make up optional 2-D VL image 23 and those that make up image 201; each pixel making up representation 222 is coded by a qualitative value from within a range of qualitative values, wherein each value corresponds to a temperature detected, as previously described for the plurality of pixels making up image 201. The plurality of pixels that make up representation 222 are further arranged in a third dimension Z, according to a magnitude of the temperature associated therewith, which arrangement can provide for a more rapid identification of zones T1 and T2 of higher temperature, which correspond to zones 1 and 2, respectively in image 201.

Figure 3A:
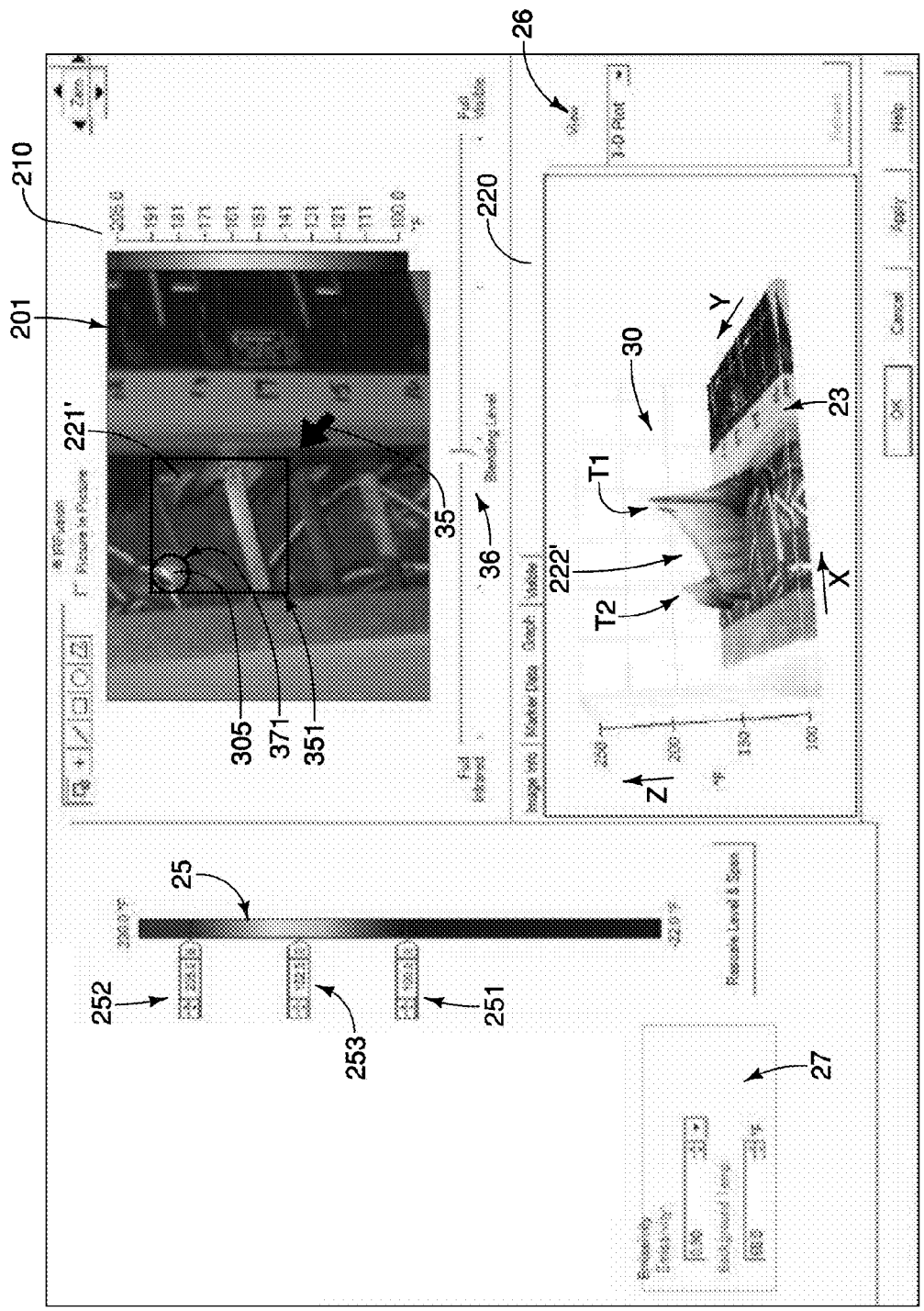
FIG. 3A is a snapshot of a graphical user interface, which is similar to that shown in FIG. 2A, except that one of the display areas includes a three-dimensional plot, or representation, according to some embodiments of the present invention.

FIG. 3A is a snapshot of a graphical user interface, which is similar to that shown in FIG. 2A, except that display area 220 includes a 3-D thermal plot, or representation 222', according to some embodiments of the present invention. FIG. 3A illustrates an interactive element 26 which includes a drop-down type menu, known to those skilled in the art, from which menu, a type of representation may be selected by a user for viewing in display area 220. In FIG. 3A, a 3-D plot, or thermal representation, has been selected, resulting in the display of representation 222', while, with reference back to FIG. 2A, a histogram was selected resulting in the display of histogram 221 in display area 220. FIG. 3A further illustrates another interactive element 27, included in the graphical user interface, whereby a user may select/specify one or more temperature correction factors, which are related to the environment of the captured scene, for example, emissivity and background temperature, in order to enhance the accuracy of temperature calculations that go into coding both the pixels of image 201 and the corresponding pixels of representation 222'.

Although, according to some alternate embodiments, representation 222' may be displayed independently of image 201, for example, as is shown for representation 222, in FIG. 2B, those embodiments in which both image 201 and representation 222/222' are displayed, side-by-side, as is shown in FIG. 3A, may provide more advantages to a user who seeks to adjust the display of representation 222/222' and/or the display of both image 201 and representation 222/222', together, for example, to facilitate more rapid and/or accurate analysis. For example, FIG. 3A illustrates a first plurality of pixels 201' having been selected, for example, via manipulation of a pointer-type interactive element 35, from the total number of pixels that make up image 201, in order to define a second plurality of pixels to make up representation 222', which second plurality of pixels is a subset of the total number of pixels that make up representation 222, shown in FIG. 2B. Although FIG. 3A shows a marker 351, which defines a boundary for the first plurality of pixels 201', that pointer 35 has selected, according to alternate embodiments, such a marker need not be displayed on image 201. It should be noted that, according to alternate embodiments, a subset of pixels may be selected from representation 222 of FIG. 2B in order to define the first plurality of pixels 201', such that the remaining pixels of image 201 are not coded.

The reduced number of the second plurality of pixels that make up representation 222' include only the higher temperature zones, for example, zones T1 and T2, and, thereby, reveal more of VL image 23, which helps to provide a context for the temperature information. Another way in which a user may gain a better view of 2-D VL image 23, in order to better appreciate the context, is to modify the opacity of the coding of the plurality of pixels that make up representation 222/222', for greater viewing transparency therethrough to VL image 23. According to the illustrated embodiment image 201 is a blended image, and an interactive element 36, which is adapted to adjust the blending of VL information with IR information in image 201, is also adapted to simultaneously, and correspondingly, adjust the opacity of the coding (IR information) of the plurality of pixels that make up representation 222/222'. Yet another method, by which a user may more clearly view 2-D VL image 23, is to rotate 3-D coordinate system 30, to change a viewing perspective thereof, for example, by moving an activated pointer, like pointer 35, which is linked to 3-D coordinate system 30, within display area 220; some alternate viewing perspectives obtained by rotating 3-D coordinate system 30 are shown in FIGS. 2B and 3B.

With further reference to FIG. 3A, the plurality of pixels that make up representation 222' may have been defined according to a selected range of temperatures, rather than by a spatial selection on image 201, via pointer 35, as previously described. One method for selecting the range of temperatures employs interactive elements 251, 252, 253, which are positioned alongside palette bar 25. A description of a suitable embodiment of interactive elements 251, 252, 253 may be found in co-pending and commonly assigned patent application, publication no. 2008/0144905, entitled NOVEL DISPLAY ADJUSTMENT FEATURES, which is hereby incorporated by reference. FIG. 3A illustrates element 251 selecting a minimum temperature of 100.0° F. and element 252 selecting a maximum temperature of 205° F., thereby defining the plurality of pixels that make up both image 201 and representation 222'. Alternately, or in addition, a color alarm mode may be enabled such that some of the pixels of the plurality that make up representation 222', which are not within a selected color alarm range, are made transparent. Descriptions of suitable embodiments of a color alarm mode may be found in co-pending and commonly assigned patent applications, publication no. 2006/0249679 and publication no. 2008/0019572, which are each hereby incorporated by reference. It should be appreciated that, although each pixel of the plurality of pixels that makes up representation 222' preferably matches, in position and coding, a corresponding pixel in the plurality of pixels that makes up image 201', to facilitate clarity in correspondence between the two images during the analysis thereof, the total number of pixels that make up representation 222' need not be equal to the total number of pixels that make up image 201'. For example, according to some embodiments, either or both of a temperature range and color alarm setting is/are independently applied to second display 220 to define the number of pixels that make up representation 222'.

Figure 3B:
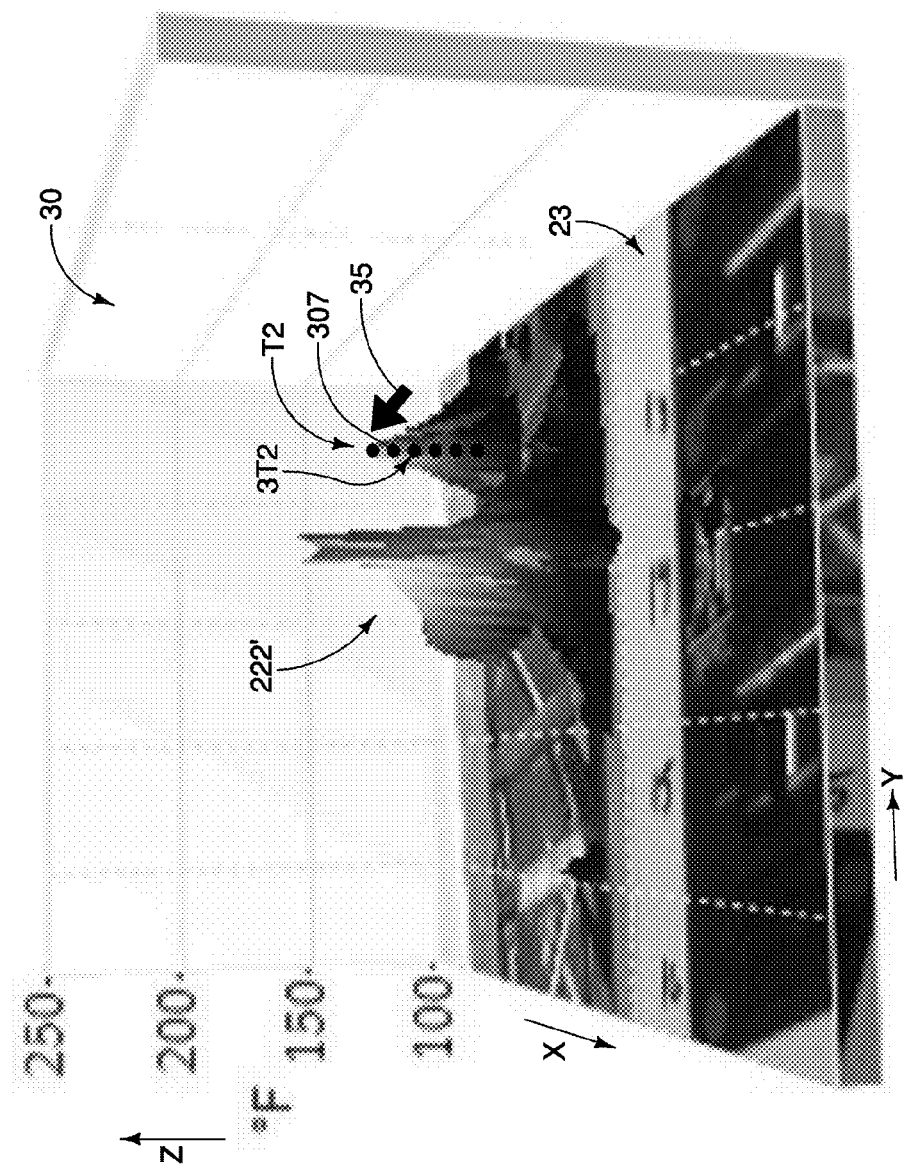
FIG. 3B is a close up view of the representation of FIG. 3A, wherein the representation has been re-oriented.

FIG. 3B is a close up view of representation 222', wherein coordinate system 30 has been re-oriented and pointer-type interactive element 35 is employed for marking. FIG. 3B illustrates pointer 35 positioned in proximity to a peak of temperature zone T2 for the selection one or more pixels 307 of the second plurality of pixels that make up representation 222'; according to some embodiments, pointer 35, when employed to select one or more pixels of the second plurality, for example, pixels 307, is adapted to affect placement of a marker on one or both of displays 210, 220. FIG. 3B further illustrates a marker line 372, which has been generated, via the selection, by pointer 35, of the one or more pixels 307; marker line 372 is shown as a dashed line projecting from the peak of zone T2 to a corresponding pixel of the plurality of pixels that makes up 2-D VL image 23 in order to better show a viewer the location of zone T2 within the context of the captured scene provided by image 23. Alternately, or in addition, the selection of the one or more pixels 307 of zone T2 on representation 222', places a marker 371 around a corresponding subset of pixels 305, from the first plurality of pixels 201' in image 201, as is shown in FIG. 3A. According to some embodiments, pointer 35 may also be used to select one or more pixels from first plurality of pixels 201' and thereby affect application of a marker to the corresponding one or more pixels of representation 222', for example, marker line 372 of FIG. 3B, or a marker arrow 351 shown in FIG. 3C. Any other means of marking one or both of image 201 and representation 222', known to those skilled in the art, may be employed by embodiments of the present invention.

Figure 3C:
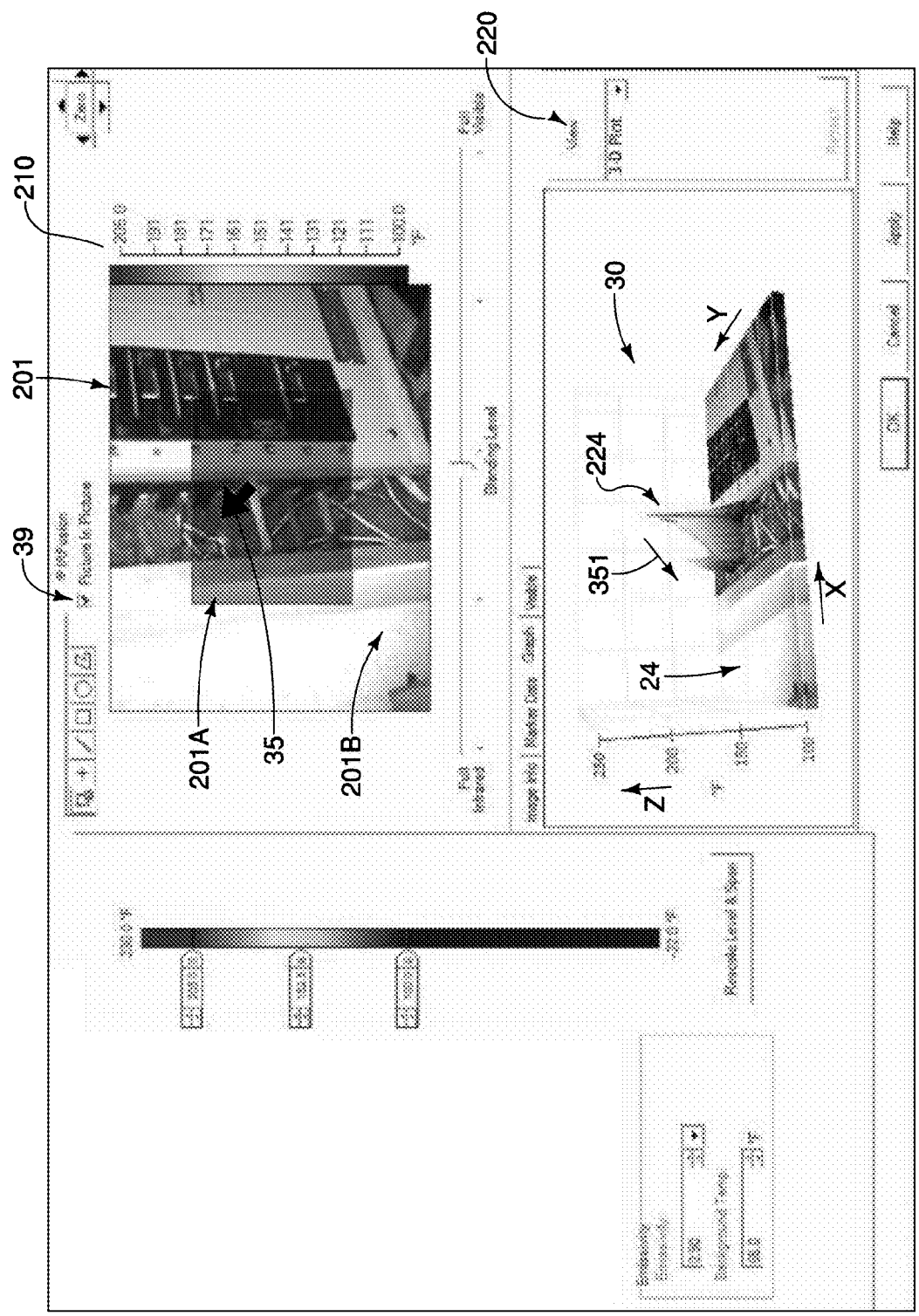
FIG. 3C is another snapshot of the graphical user interface shown in FIG. 3A.

FIG. 3C is another snapshot of the graphical user interface shown in FIG. 3A, wherein the plurality of pixels that make up image 201 is divided into two subsets 201A, 201B, for a picture-in-picture type display. FIG. 3C illustrates an interactive element 39 for selecting this type of display, for example, as an alternative to the display of image 201 shown in FIGS. 2A and 3A. According to the illustrated embodiment, first subset 201A includes coded/IR pixels, which correspond to a plurality of pixels that make up a 3-D thermal plot, or representation 224, and second subset 201B includes VL pixels, which correspond to a 2-D VL image 24, which is displayed in conjunction with representation 224, within display area 220. FIG. 3A further illustrates the plurality of pixels, that make up representation 224, being arranged along first, second and third axes X, Y and Z of 3-D coordinate system 30 and 2-D VL image 24 arranged along first and second axes X and Y, of 3-D coordinate system 30. The illustrated picture-in-picture type display can provide a larger context, in both display areas 210, 220 for the temperature information conveyed by the coded pixels.

The above-described user interface features may be implemented, for example, via a chart control tool available from Nevron. Turning now to the flow chart of FIG. 4, various methods of the invention, which are facilitated by these user interface features will be described. FIG. 4 illustrates an initial step 401 wherein a user selects a 3-D thermal plot, for example, any of the previously illustrated thermal representations 222, 222', 224, from a plurality of alternative representations, for example, also including a line temperature profile plot and/or a histogram, like histogram 221 of FIG. 2A, Once selected, the 3-D thermal representation is displayed alongside a 2-D image so that the user, per step 403 may view the representation in conjunction with the 2-D image. According to some embodiments, the 2-D image is presented in a separate display area of the interface from that in which the 3-D thermal plot, or representation, is displayed, and is made up of a plurality of coded/IR pixels, for example, like image 201 shown in FIGS. 3A and 3C, and each of the plurality of coded/IR pixels that makes up the 3-D thermal plot matches, in position and coding, a corresponding coded pixel of the 2-D image. Alternately, the 2-D image is made up of VL pixels and is positioned within the same display area of the interface as the 3-D plot, for example, like image 23 of FIGS. 2B and 3A-B or image 24 of FIG. 3C. Thus, a user interface of the present invention may include both display areas 210 and 220, as is illustrated in FIGS. 3A and 3C, may include both display areas 210 and 220, without including 2-D VL image 23, 24, or may include a display area in which 3-D plot, or thermal representation 222, 222', 224 is shown, in conjunction with the corresponding 2-D VL image 23, 24, without a display area in which image 201 is shown.

With further reference to FIG. 4, preferred embodiments of the present invention allow for a user to adjust the presentation of the 3-D plot via interactive elements provided by the user interface. For example, a user may change their viewing perspective by rotating the 3-D coordinate system in which the plot is plotted, as previously described; and/or may change the extent of the 3-D plot to encompass only regions of interest, either by spatially selecting a subset of pixels, as described in conjunction with FIG. 3A, or by selecting a range of temperatures, also described in conjunction with FIG. 3A; and/or may adjust an opacity of the coding of the pixels that make up the 3-D plot, to increase transparency; and/or may affect the coding by selecting/specifying one or more temperature correction factors, for example, emissivity and background temperature, in order to enhance the accuracy of temperature calculations that go into coding the pixels of the 3-D plot. FIG. 4 further illustrates a step 407, which follows step 405, but may alternately precede step 405, according to alternate methods, wherein the user marks the 3-D plot and/or the 2-D image. As previously described, in conjunction with FIGS. 3A-B, the user may select one or more pixels of the 3-D plot to affect placement of a marker around or on one or more corresponding pixels of the 2-D image, or visa versa. Also, as previously described, the user, by selecting one or more pixels of the 3-D plot, may, according to some embodiments, generate a marker line that projects onto a 2-D image which is presented along the X and Y axes of the 3-D coordinate system in which the 3-D plot is plotted. Once generated, any or all of these user-generated markers may, preferably, be moved and edited by the user, according to some embodiments.

Figure 5:
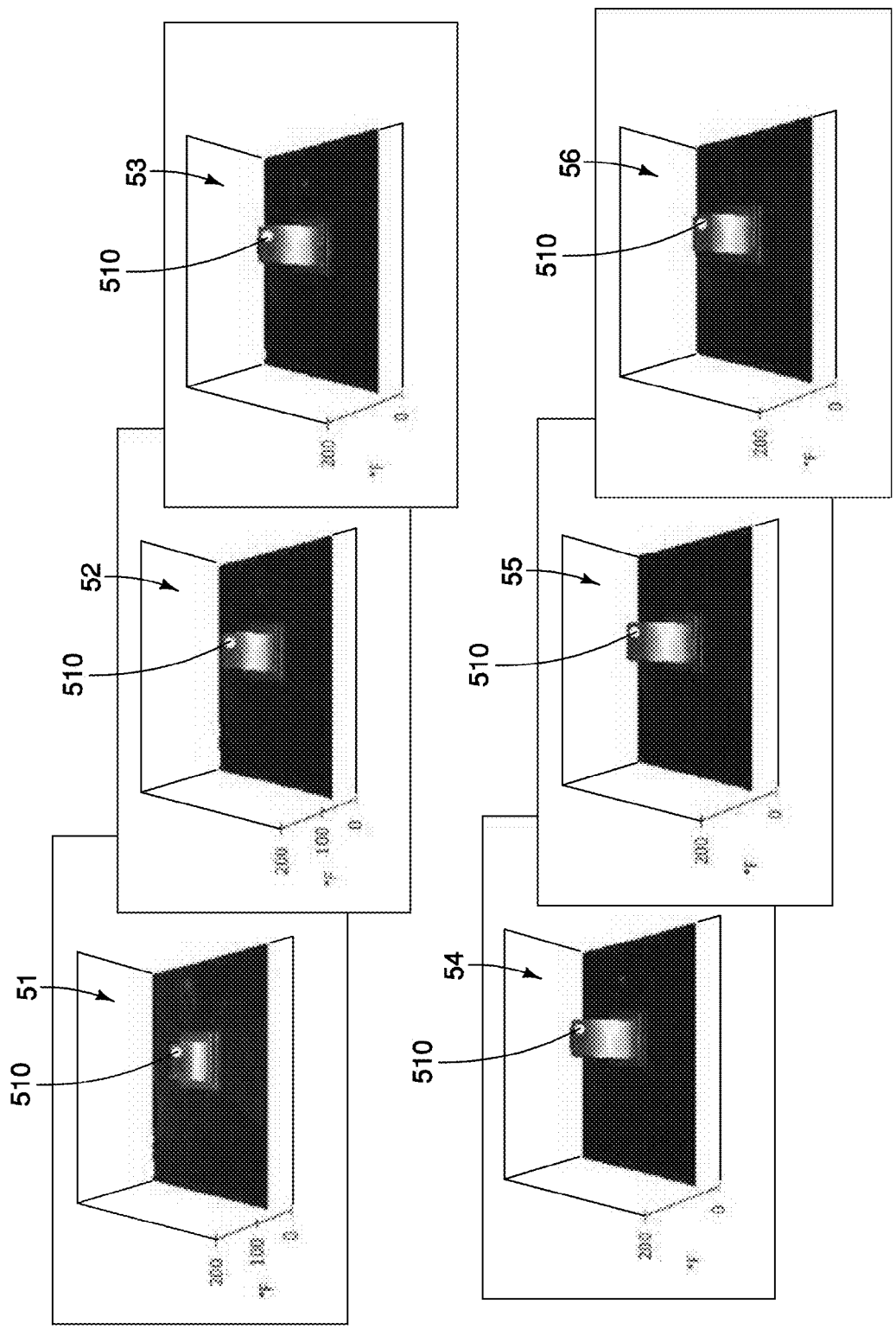
FIG. 5 is schematic presenting a plurality of three-dimensional plots, which may be generated, according to some embodiments of the present invention, to track temporal changes in temperature across a scene captured at a plurality of different times, by a thermal imaging device.

In some applications of chronic monitoring, for example, in non-destructive system testing, a thermal imaging device captures a scene at a plurality of times, in order to track temporal changes in a temperature distribution across the scene. According to some embodiments of the present invention, for these applications, a plurality, or series, of 3-D thermal representations, or plots, of the captured scene, for example, plots 51-56 shown in FIG. 5, are generated and displayed on the user interface. Each of the plurality of 3-D representations may be displayed, in a video sequence, either alongside the corresponding 2-D VL image of the scene, within a single 3-D coordinate system of the user interface, or alongside a plurality of 2-D thermal images, similar to image 201, described above, which are also displayed in a video sequence. Alternately, each of the plurality of 3-D representations may be displayed alongside one another, simultaneously. With reference to the series of plots 51-56, shown in FIG. 5, it may be appreciated that either type of display, by presenting temperature magnitudes in the third dimension, as well as by the coding of the plurality of pixels, which form each thermal representation 51-56, can facilitate the monitoring of temperature changes over time. FIG. 5 further illustrates an optional marker 510, which may be employed to further facilitate temperature tracking, over time, for a particular pre-selected location within the captured scene; marker 510 is shown marking a subset of the plurality of pixels, that corresponds to the pre-selected location, at each time. An interactive element, for example, previously described pointer 35, of the user interface, which displays the sequence of plots 51-56, may be used to select the pre-selected location in the captured scene. According to some preferred embodiments, the user interface may further include a table containing a plurality of temperature values, each value corresponding to a magnitude of the temperature at the pre-selected location in the captured scene at each of the different times. The video sequence of plots 51-56 may be presented in a first display area of the user interface and the table of temperatures in a second display area, alongside the first display area, according to some embodiments.

Finally, it should be mentioned that any of the 3-D thermal representations, described above, may be placed into any suitable format for a printed report. The printed report may be configured to include a 3-D thermal representation of a captured scene presented alongside a corresponding 2-D image of the scene, and/or a series of 3-D thermal representations to show temperature changes, over time, within the captured scene, for a trend analysis. For the latter, a table of temperatures, as previously described, may be presented in the report along with the series.

In the foregoing detailed description, the invention has been described with reference to specific embodiments. However, it may be appreciated that various modifications and changes can be made without departing from the scope of the invention as set forth in the appended claims.

We claim:

1. A graphical user interface for a thermography software program, the interface comprising:
   a display member,
   a first display area including an image of a scene captured by a thermal imaging device, the image being displayed by the interface in two dimensions and comprising a first plurality of pixels, each pixel of the first plurality being coded by a qualitative value from within a range of qualitative values, and each value, within the range of qualitative values, corresponding to a temperature; and
   a second display area including a representation of the captured scene, the representation being displayed by the interface in three dimensions and comprising a second plurality of pixels corresponding to the first plurality of pixels and being arranged in a first and a second dimension of the three dimensions according to the arrangement of the first plurality of pixels, each pixel of the second plurality being coded by the same qualitative value that codes the corresponding pixel of the first plurality, and each pixel of the second plurality being further arranged in the third dimension according to a magnitude of the temperature associated therewith;
   wherein the first and second display areas are presented alongside one another on the display member.

2. The interface of claim 1, wherein the image further comprises a third plurality of pixels representing a visible light portion of the image.

3. The interface of claim 1, further comprising an interactive element adapted for selecting one or both of: the first plurality of pixels from a total number of pixels that make up the image, and the second plurality of pixels from a total number of pixels that make up the representation.

4. The interface of claim 1, further comprising an interactive element adapted for selecting a range of temperatures in order to establish one or both of: the first plurality of pixels and the second plurality of pixels.

5. The interface of claim 4, wherein the interactive element comprises a palette bar.

6. The interface of claim 1, further comprising an interactive element adapted for selecting the representation from a plurality of alternative representations of the captured scene.

7. The interface of claim 1, further comprising an interactive element adapted for entering at least one temperature correction factor, the at least one correction factor affecting the coding of the first and second plurality of pixels.

8. The interface of claim 1, further comprising:
   an interactive element adapted for selecting a subset of one or more pixels of one of: the first plurality of pixels on the image, and the second plurality of pixels on the representation; and
   a marker, associated with the element, adapted for marking a corresponding subset of the other of: the first plurality of pixels on the image, and second plurality of pixels on the representation.

9. The interface of claim 8, wherein the interactive element is further adapted for marking the selected subset of one or more pixels.

10. The interface of claim 1, wherein the second display area further includes a visible light image of the captured scene, the visible light image being presented adjacent the representation and comprising a third plurality of pixels arranged in the first and second dimensions of the three dimensions of the representation to correspond with the second plurality of pixels.

11. The interface of claim 10, further comprising an interactive element adapted for adjusting an opacity of the coding of the second plurality of pixels.

12. The interface of claim 10, further comprising:
   an interactive element adapted for selecting a subset of one or more pixels of the second plurality of pixels on the representation; and a marker, associated with the element, adapted for marking a corresponding subset of the third plurality of pixels.

13. The interface of claim 12, wherein the interactive element is further adapted for marking the subset of the one or more pixels.

14. The interface of claim 12, wherein the marker comprises a line that projects from the selected subset of one or more pixels to the corresponding subset of the third plurality of pixels.

15. The interface of claim 1, further comprising an interactive element adapted for marking the representation of the captured scene.

16. A method for analyzing a temperature distribution across a captured scene, the scene having been captured by a thermal imaging device, and the method comprising:
    viewing an image, presented in two dimensions, of the captured scene alongside a representation, presented in three dimensions, of the captured scene, the image and the representation being located within a single window of a user interface of a computer; and
    locating a region of interest of the captured scene in the representation;
    wherein the image comprises a first plurality of pixels, each pixel of the first plurality being coded by a qualitative value from within a range of qualitative values, and each value, within the range of qualitative values, corresponding to a temperature; and
    the representation comprises a second plurality of pixels corresponding to the first plurality of pixels and being arranged in a first and a second dimension of the three dimensions according to the arrangement of the first plurality of pixels, each pixel of the second plurality being coded by the same qualitative value that codes the corresponding pixel of the first plurality, and each pixel of the second plurality being further arranged in the third dimension according to a magnitude of the temperature associated therewith.

17. The method of claim 16, further comprising selecting, via an interactive element of the user interface, the first plurality of pixels from a total number of pixels that make up the image.

18. The method of claim 16, further comprising selecting, via an interactive element of the user interface, the second plurality of pixels from a total number of pixels that make up the representation.

19. The method of claim 16, further comprising selecting, via an interactive element of the user interface, a range of temperatures in order to establish either one or both of: the first plurality of pixels and the second plurality of pixels.

20. The method of claim 16, further comprising selecting, via an interactive element of the user interface, a subset of one or more pixels of one of: the first plurality of pixels on the image, and the second plurality of pixels on the representation, in order to mark, via a marker of the user interface, and thereby view, a corresponding subset of the other of: the first plurality of pixels on the image, and the second plurality of pixels on the representation.

21. The method of claim 16, further comprising selecting, via an interactive element of the user interface, at least one temperature correction factor, the selection affecting the coding of the first and second plurality of pixels.

22. The method of claim 16, further comprising viewing a visible light image of the captured scene, the visible light image being presented adjacent the representation and comprising a third plurality of pixels arranged in the first and second dimensions of the three dimensions of the representation to correspond with the second plurality of pixels.

23. The method of claim 22, further comprising selecting, via an interactive element of the user interface, a subset of one or more pixels of the second plurality of pixels on the representation, in order to mark, via a marker of the user interface, and thereby view, a corresponding subset of one or more pixels of the third plurality of pixels on the visible light image.

24. The method of claim 22, further comprising adjusting, via an interactive element of the user interface, an opacity of the coding of the second plurality of pixels.

25. The method of claim 16, selecting, via an interactive element of the user interface, the representation from a plurality of alternative representations of the captured scene.

26. The method of claim 16, further comprising rotating the representation.

27. A method for analyzing a temperature distribution across a captured scene, the scene having been captured by a thermal imaging device, and the method comprising:
    viewing a two-dimensional visible light image of the captured scene alongside at least one three-dimensional thermal representation of the captured scene, the visible light image and the at least one thermal representation being presented together, within a single three-dimensional coordinate system, which coordinate system is located in a display area of a user interface of a computer; and
    locating at least one position within the visible light image that corresponds with a particular temperature of the at least one thermal representation;
    wherein the visible light image comprises a first plurality of pixels arranged in a first dimension and a second dimension of the three-dimensional coordinate system;
    each of the at least one three-dimensional thermal representation comprises a second plurality of pixels, each pixel of the second plurality being coded by a qualitative value from a range of qualitative values, and each value, within the range of qualitative values, corresponding to a temperature;
    the second plurality of pixels corresponds to the first plurality of pixels and is arranged in the first and second dimensions of the three-dimensional coordinate system according to the arrangement of the first plurality of pixels; and
    each of the second plurality of pixels is further arranged in a third dimension of the three-dimensional coordinate system according to a magnitude of the temperature associated therewith.

28. The method of claim 27, further comprising selecting, via an interactive element of the user interface, a range of temperatures in order to establish the second plurality of pixels.

29. The method of claim 27, further comprising selecting, via an interactive element of the user interface, a subset of one or more pixels of the second plurality of pixels on the at least one three-dimensional thermal representation, in order to mark, via a marker of the user interface, and thereby view, a corresponding subset of one or more pixels of the first plurality of pixels on the visible light image.

30. The method of claim 27, further comprising selecting, via an interactive element of the user interface, at least one temperature correction factor, the selection affecting the coding of the second plurality of pixels.

31. The method of claim 27, further comprising rotating the three-dimensional coordinate system to change a perspective for viewing the two-dimensional visible light image and the at least one three-dimensional thermal representation.

32. The method of claim 27, further comprising adjusting, via an interactive element of the user interface, an opacity of the coding of the second plurality of pixels.

33. The method of claim 27, wherein:
the scene has been captured at a plurality of different times; and
the at least one three-dimensional thermal representation comprises a plurality of three-dimensional thermal representations, each of the plurality of thermal representations corresponding to one of the plurality of different times at which the scene was captured.

34. The method of claim 33, wherein viewing the two-dimensional visible light image alongside the at least one three-dimensional thermal representation comprises viewing each of the plurality of three-dimensional thermal representations together, alongside one another.

35. The method of claim 33, wherein viewing the two-dimensional visible light image alongside the at least one three-dimensional thermal representation comprises viewing each of the plurality of three-dimensional thermal representations, in a video sequence, within the single three-dimensional coordinate system.

36. The method of claim 35, further comprising selecting, via an interactive element of the user interface, a location in the first and second dimensions of the three-dimensional coordinate system, in order to mark, via a marker of the user interface, and thereby view, a magnitude of a temperature at the location at each of the plurality of different times.

37. A graphical user interface for a thermography software program, the interface comprising:
a display member;
a display area including a two-dimensional visible light image of a captured scene, captured by a thermal imaging device, alongside at least one three-dimensional thermal representation of the captured scene, the visible light image and the at least one thermal representation being presented together on the display member, within a single three-dimensional coordinate system;
wherein the visible light image comprises a first plurality of pixels arranged in a first dimension and a second dimension of the three-dimensional coordinate system;
each of the at least one thermal representation comprises a second plurality of pixels corresponding to the first plurality of pixels, each pixel of the second plurality being coded by a qualitative value from a range of qualitative values, and each value, within the range of qualitative values, corresponding to a temperature;
the second plurality of pixels is arranged in the first and second dimensions of the three-dimensional coordinate system according to the arrangement of the first plurality of pixels; and
each of the second plurality of pixels is further arranged in a third dimension of the three-dimensional coordinate system according to a magnitude of the temperature associated therewith.

38. The user interface of claim 37, further comprising an interactive element adapted for selecting a range of temperatures in order to establish the second plurality of pixels.

39. The user interface of claim 38, wherein the interactive element comprises a palette bar.

40. The user interface of claim 37, further comprising:
an interactive element adapted for selecting a subset of one or more pixels of the second plurality of pixels; and
a marker, associated with the element, adapted for marking a corresponding subset of one or more pixels of the first plurality of pixels on the visible light image.

41. The user interface of claim 37, further comprising an interactive element adapted for entering at least one temperature correction factor, the at least one correction factor affecting the coding of the second plurality of pixels.

42. The user interface of claim 37, further comprising an interactive element adapted for adjusting an opacity of the coding of the second plurality of pixels.

43. The user interface of claim 37, wherein the at least one three-dimensional thermal representation of the captured scene comprises a plurality of three-dimensional thermal representations of the captured scene, the captured scene having been captured at a plurality of different times such that each of the plurality of three-dimensional thermal representations corresponds to one of the plurality of different times.

44. A graphical user interface for a thermography software program, the interface comprising:
a display member on which at least one element of said interface is shown, a first display area adapted to display a video sequence of a plurality of pixels that make up a three-dimensional thermal representation of a captured scene, the captured scene having been captured by a thermal imaging device at a plurality of different times, each of the plurality of pixels being fixed in a first dimension and in a second dimension, according to a corresponding location in the captured scene, each of the plurality of pixels being coded by a qualitative value from a range of qualitative values, each value, within the range, corresponding to a temperature at each of the plurality of different times, and each of the plurality of pixels being arranged in a third dimension according to a magnitude of the temperature at each location in the captured scene, at each of the plurality of different times; and
a second display area including a table containing a plurality of temperature values, each of the plurality of temperature values corresponding to a magnitude of a temperature at a pre-selected location in the captured scene at each of the plurality of different times;
wherein the first and second display areas are presented alongside one another.

45. The interface of claim 44, further comprising:
an interactive element adapted for selecting the pre-selected location within the captured scene; and
a marker, associated with the element, adapted for marking a subset of the plurality of pixels corresponding to the pre-selected location at each of the plurality of different times, in the first display area.

* * * * *